United States Patent [19]

Cantrell

[11] Patent Number: 4,542,684
[45] Date of Patent: Sep. 24, 1985

[54] FRY BASKET AND SEPARATOR INSERT SYSTEM

[76] Inventor: David D. Cantrell, 4304 McCampbell La., Knoxville, Tenn. 37918

[21] Appl. No.: 568,429

[22] Filed: Jan. 5, 1984

[51] Int. Cl.⁴ ............................................. A47J 37/12
[52] U.S. Cl. ........................................ 99/403; 24/545;
99/413; 99/416; 99/426; 99/448; 211/181;
D7/409
[58] Field of Search ................. D7/409; 211/13, 59.1,
211/181; 426/523; 24/543, 545, 563;
99/410–418, 426, 403, 448

[56] References Cited

U.S. PATENT DOCUMENTS

| | | | |
|---|---|---|---|
| 2,052,505 | 8/1936 | Vetrosky | Dig. 7/409 X |
| 2,467,337 | 4/1949 | Schnell | 99/413 X |
| 2,740,349 | 4/1956 | DeGonia | 99/426 |
| 3,203,066 | 8/1965 | Lupoli | 24/545 |
| 3,424,076 | 1/1969 | Bernatz | 99/416 |
| 3,466,999 | 9/1969 | Yanez-Pastor | 99/413 |
| 3,613,553 | 10/1971 | Popeil | 99/403 X |
| 3,985,071 | 10/1976 | Pottinger | 99/403 |
| 4,006,675 | 2/1977 | Lill | 99/417 |
| 4,232,596 | 11/1980 | Kroll | 99/410 |

FOREIGN PATENT DOCUMENTS 10321 of 1894 United Kingdom ................ 99/415

Primary Examiner—Billy J. Wilhite

[57] ABSTRACT

The specification discloses a system for frying food items including a fry basket and an insert which functions to maintain the food items in the fry basket in a separated condition. The insert is dimensioned to fit at least partially within the fry basket and is removably disposed therein. The insert includes two longitudinal support members, a plurality of elongate transverse support members extending between the longitudinal support members and a plurality of separators extending from the transverse support members. The insert may be used in at least two positions, a downwardly facing position or an upwardly facing position and it may be used with or without clips to secure it to the basket.

10 Claims, 5 Drawing Figures

FRY BASKET AND SEPARATOR INSERT SYSTEM

The present invention relates to frying baskets and particularly relates to a frying basket having a removable insert.

It has long been recognized that many types of food items when frying in hot oil should be maintained in a separated condition while frying and numerous attempts have been made to design fry baskets to hold the food items in a separated condition. For example, U.S. Pat. No. 4,232,596 to Kroll discloses a fry basket having a plurality of pouches for frying pies and fish fillets. A similar fry basket is shown in U.S. Pat. No. 4,006,675 to Lill in which a fry basket includes a plurality of movable shelves designed to maintain food in a separated condition that is cooked in the fry basket. The patent to Pottinger et al, U.S. Pat. No 3,985,071, discloses a clam shell type of cooling basket for use in deep fat cooking in which there is disclosed the use of a plurality of grill like horizontal trays that are used to support and separate the food cooking within the basket.

While these known baskets have performed the function of holding food items in a separated condition while frying, they are relatively expensive to produce, are not very versatile, are difficult to clean, and expensive to produce. The shortcomings of prior known devices are overcome in the present invention by providing a fry basket with a removable insert. This system provides an inexpensive and versatile way to maintain frying foods in a separated condition. The only additional cost of the basket and insert system of the present invention over a conventional fry basket is the cost of the insert. Since the insert used in the system of the present invention is designed to be easily removed from the fry basket, cleaning of both the fry basket and the insert is easy compared to known compartmentalized fry baskets. The insert can be used either facing upwardly in the bottom of the fry basket or facing downwardly from the top of the fry basket. Finally, since the insert is removable, the removal of food from the fry basket is facilitated. That is, the fry basket and the insert may be simultaneously removed to easily remove cooked food items from the fry basket.

In accordance with the present invention, a fry basket and separator insert system is provided for use in frying food items in hot oil while maintaining the food items in a separated condition. The system includes a fry basket constructed of wire. The fry basket has a bottom wall, two side walls, two end walls and an open top with the side walls defining the length of the fry basket, the end walls defining the width of the fry basket and the depth of the fry basket being defined by the distance from the bottom wall to the distal upper edges of the end and side walls. At least one of the side walls is constructed of wire formed into a pattern with openings of a sufficiently large size to allow rapid egress and ingress of oil and of a sufficiently small size to prevent the food items from passing through the openings.

The system also includes an insert dimensioned to fit at least partially within the fry basket and it is removably disposed therein to maintain the food items in the fry basket in a separated condition. The insert has at least one elongated longitudinal support member having a length of about the length of the fry basket for being disposed in a side-by-side parallel relationship with a side wall of the fry basket. A plurality of elongate transverse support members extend from the longitudinal support member and the transverse support members are disposed in a coplanar relationship, one with the other. A plurality of elongate separators extend from the plane defined by the transverse support members with at least one separator extending from each of said transverse support members. The insert is oriented within the fry basket to dispose the plurality of separators in a center region of the fry basket so that the separators are disposed between food items placed in the fry basket to prevent food from sticking together.

In the preferred embodiment, two elongate longitudinal support members are used and the plurality of transverse support members extend perpendicularly between the longitudinal support members. The plurality of elongate separators extend perpendicularly from the transverse support members in a direction perpendicular to the plane defined by the transverse support members.

The insert may be disposed with both of the longitudinal support members resting on the bottom of the fry basket with the separators extending upwardly or the longitudinal support members may be positioned adjacent the upper end of the fry basket with the separators extending downwardly into the center region of the fry basket.

In frying food items using this system, the following method may be employed. First, the removable separator is inserted into the fry basket and food items are placed into the fry basket while maintaining the food items in a separated condition using the separators. The fry basket is then lowered into the oil and the food is cooked. Next, the fry basket is removed and the insert and the food are simultaneously removed from the fry basket by rotating the fry basket to face downwardly. The weight and movement of the insert falling from the fry basket will facilitate the removal of food from the fry basket.

The present invention may best be understood by reference to the following Detailed Description of a preferred embodiment when taken in consideration with the Drawings in which.

Figure 1:
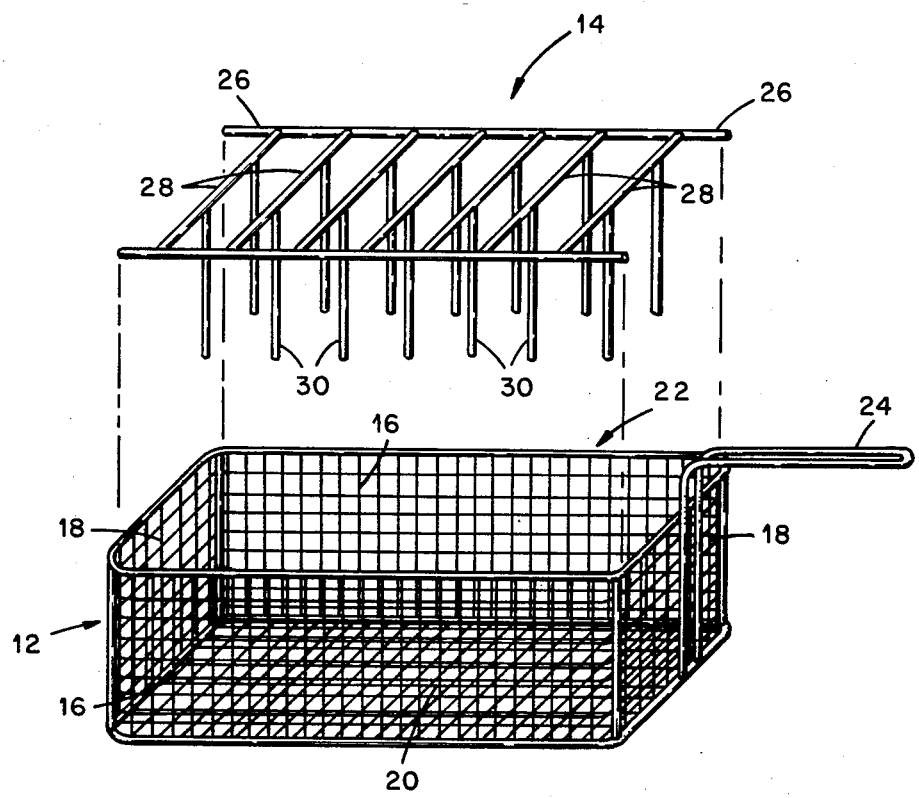
FIG. 1 is an exploded view of a fry basket and an insert of the present invention.

Referring now to the drawings in which like reference characters designate like or corresponding parts throughout the several views, there is shown in FIG. 1 a fry basket 12 and an insert 14 embodying one form of the present invention. The fry basket 12 is constructed of wire and has two side walls 16, two end walls 18, a bottom wall 20 and an open top 22. All side walls 16 and 18 and the bottom wall 20 are constructed in a wire pattern to form a plurality of openings that are sufficiently larege to allow rapid egress and ingress of oil and yet are sufficiently small to prevent food items from passing through the basket walls.

A handle 24 is attached to one end wall 18 of the fry basket 12 and is used to lower the basket into a vessel containing oil and to lift it back out.

In FIG. 1, the insert 14 is shown in a position aligned above the fry basket 12 ready for insertion. The insert 14 is preferably constructed of wire such as stainless steel and the various parts are preferably welded together. The insert 14 includes a pair of elongate longitudinal support members 26 with a plurality of transverse support members 28 perpendicularly extending between the longitudinal support members 26. The longitudinal support members 26, in this preferred embodiment, are about twelve and seven-eighths inches long which is about the length of the fry basket 12. The transverse support members 28 are about five inches long which is about the width of the fry basket 12. A plurality of elongate separators 30 extend downwardly from the transverse support members 28 in a direction perpendicular to the plane defined by the members 28. Two separators 30 extend from each transverse support member 28 so that the separators 30 on each support member 28 form a separator wall. In use food items are placed between the transverse support members 28 and between the separator walls formed by the separators 30. In this embodiment, the separators 30 are about four inches long which is about the depth of the fry basket 12.

Figure 2:
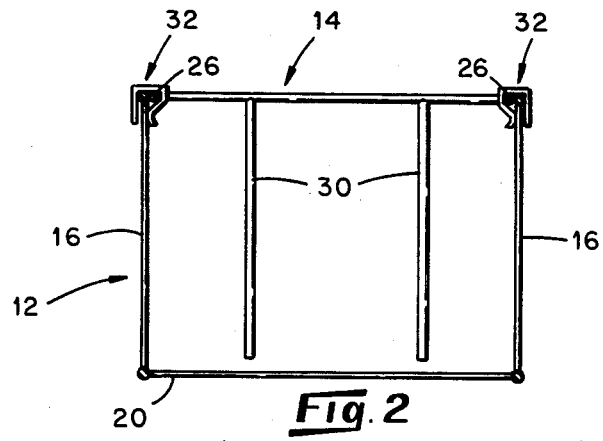
FIG. 2 is a somewhat diagrammatical end cross-sectional view of a fry basket with a downwardly facing insert disposed therein.

When the insert 14 is lowered into the fry basket 12, it will assume the position shown in FIG. 2 which is a somewhat diagrammatical end cross-sectional view of the fry basket 12 and insert 14. In this view, the longitudinal support members 26 are disposed adjacent to the top edge of the side walls 16 and a clip 32 is used to secure the members 26 to the fry basket 12. Thus, the longitudinal support members 26 and the transverse support members 28 are removably secured adjacent to the open top of the fry basket 12.

Figure 3:
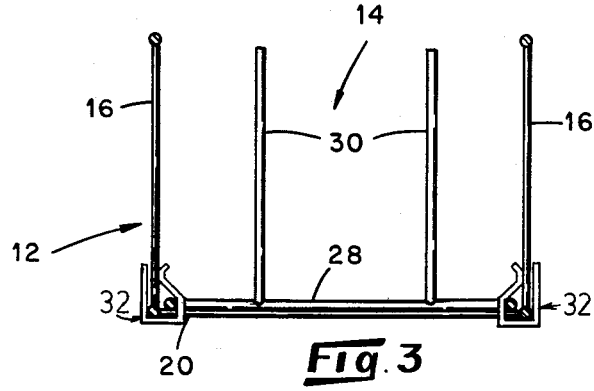
FIG. 3 is a somewhat diagrammatical end cross-sectional view of a fry basket and an upwardly facing insert disposed therein.

Alternatively, the insert 14 may be used in the manner shown in FIG. 3 which is another somewhat diagrammatical end cross-sectional view of the fry basket 12 and insert 14. In this view, the insert 14 has been rotated 180° and lowered into the fry basket 12. Thus, the separators 30 extend upwardly. In this configuraion, the separators 30 may still be used to separate items such as fish fillets, one from the other, by individually inserting the food items between the separators 30, or the food may be indescriminately dropped into the fry basket and allowed to find its own position. In this manner, a random distribution of the food items will occur and the separator will randomly separate the food items. This method may be preferred when cooking cubed items or smaller food items.

The insert 14 may simply rest in the bottom of the fry basket 12 as shown in FIG. 3, or the clips 32 shown in FIG. 2 may be used to secure the longitudinal support members 26 of the insert 14 to the fry basket in a manner similar to that shown in FIG. 2. If the insert is allowed to simply rest in the bottom of the fry basket, it will fall from the fry basket when it is rotated 180°. Thus, after the food is cooked, the fry basket may be removed and rotated dumping both the food and the insert 14 from the fry basket 12. In this manner, the falling insert 14 will facilitate the removal of the food items from the fry basket.

Figure 4:
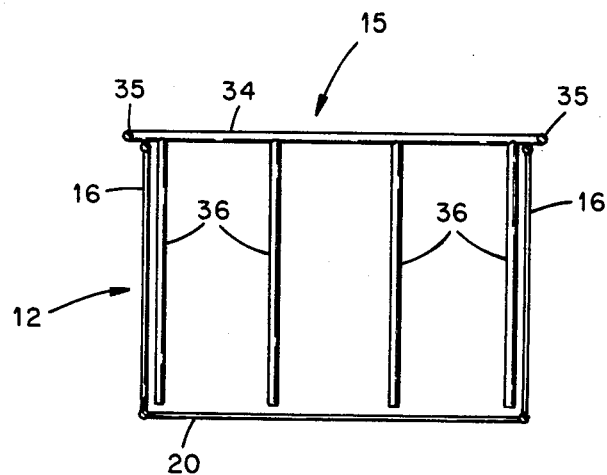
FIG. 4 is somewhat diagrammatical end cross-sectional view of a fry basket and another downwardly facing insert.

The insert 14 was designed to fit completely within the fry basket 12. In an alternate embodiment, an insert could be designed to fit only partially within the fry basket. For example, as shown in FIG. 4, another insert 15 is shown having transverse support members 34 that are dimensioned having a length slightly greater than the width of the fry basket 12. Thus, when the insert 15 is lowered toward the fry basket 12, only the separators 36 are actually disposed within the fry basket. The transverse separators 34 are disposed immediately above the fry basket and rest on the edges of the two side walls 16. The longitudinal support members 35 that are attached to the ends of the transverse support members 34 are disposed adjacent to and slightly outside of the upper edges of the end walls 16.

As shown in FIG. 4, in this embodiment, four separators 36 are used. The outer separators 36 nearest the ends of the transverse support members 34 are designed to fit almost immediately next to the end walls 16. Thus, the separators 36 perform a centering function so that the insert 15 is centered with respect to the fry basket 12. The separators 36 will limit transverse movement of the insert 15 and will prevent one side of the frying basket from becoming dislodged from the upper edge of the ends walls 16.

As shown in FIG. 4, the insert 15 may simply rest on the fry basket 12. Alternatively, clips 32 could be used to secure the insert 15 to the fry basket 12 in the manner shown in FIG. 2.

Figure 5:
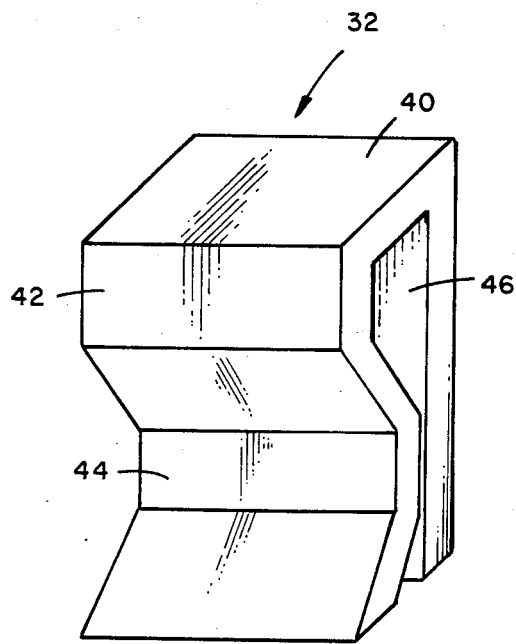
FIG. 5 is a perspective view of a clip used to secure the insert to the fry basket.

Referring now to FIG. 5, there is shown an isometric view of the clip 32. It will be understood that although numerous types of clips or other fasteners could be used to secure the insert 14 or 15 in the fry basket 12, clip 32 is preferred. Clip 32 is constructed of one-eighth inch resilient stainless steel metal and is originally a stainless steel sheet measuring three-quarters inch by two and three-eights inches. It is formed into a clip by an appropriate conventional forming process such as a heat press. The clip includes a back portion 38, a top 40 and front vertical portion 42 and a curved contact portion 44. A void 46 is formed between the back portion 38 and the front vertical portion 42. To secure the insert 14 to the fry basket 12, the longitudinal support member 26 and a wire of the fry basket 12 are inserted into the void 46. Preferably, four clips are used to secure the insert 14 (or 15) to the fry basket 12.

Although preferred embodiments have been described in the foregoing Detailed description, it will be understood that the invention is capable of numerous rearrangements, modifications or substitution of parts without departing from the scope and spirit of the invention as defined by the appended claims.

What is claimed is:

1. A fry basket and separator insert system for use in frying food items in oil while maintaining the food items in a separated condition, comprising:

a fry basket constructed of wire, said fry basket having a bottom wall, two side walls, two end walls and an open top, said side walls defining the length of said fry basket, said end walls defining the width of said fry basket and the depth of said fry basket being defined by the distance from said bottom wall to the distal upper edges of said end and side walls, at least one of said walls being constructed of wire formed into a pattern with openings of a sufficiently large size to allow rapid egress and ingresss of hot oil and of a sufficiently small size to prevent the foot items from passing through the openings; and an insert dimensioned to fit at least partially within the fry basket and being removably disposed at least partially within the fry basket to maintain food items in said fry basket in a separated condition, said insert comprising:

at least one elongate longitudinal support member having a length of about the length of said fry basket for being disposed in a side by side parallel relationship with a side wall of said fry basket;

a plurality of elongate transverse support members extending from said longitudinal support member, said transverse support members being in a substantially co-planar relationship one with the other;

a plurality of elongate separator rods extending from said transverse support members with at least one separator rod extending from each of said transverse support members; and said insert being oriented to dispose said plurality of elongate separator rods in a center region of said fry basket, whereby said separator rods are disposed between food items placed in said fry basket to prevent the food from sticking together.

2. The system of claim 1 wherein:

said elongate longitudinal support member is dimensioned having a length of less than the length of said fry basket and is disposed in a side-by-side parallel adjacent relationship with a side wall and said bottom wall of said fry basket;

said plurality of elongate transverse members are disposed adjacent to and supported by said bottom wall of said fry basket;

said plurality of elongate separator rods being oriented to extend upwardly from said transverse support members into the center region of said fry basket; and said insert being removably disposed within said fry basket so that said insert and food items may be removed from said fry basket by rotating said fry basket to face said open top downwardly.

3. The system of claim 2 wherein said insert is dimensioned and disposed to rest on the top edge of at least two of said walls with the elongate separator rods extending downwardly into a center region of said fry basket, whereby said insert may be removed from said fry basket by rotating it to face said open top downwardly.

4. The system of claim 1 wherein said insert is dimensioned to fit within and is disposed completely within said fry basket and further comprising means for removably securing at least one of said support members adjacent to the upper edge of one of said walls with said separators extending downwardly into the center region of said fry basket.

5. The system of claim 1 wherein said insert is dimensioned to fit within and is disposed completely within said fry basket with said longitudinal support member being disposed adjacent to a side wall and said bottom wall of said fry basket and further comprising means for removably securing at least one of said support members to said fry basket.

6. A fry basket and separator insert system for use in frying food items in hot oil while maintaining the food items in a separated condition, comprising:

a fry basket constructed of wire, said fry basket having a bottom wall, two side walls, two end walls and an open top, said side walls defining the length of said fry basket, said end walls defining the width of said fry basket and the depth of said fry basket being defined by the distance from said bottom wall to the distal upper edges of said end and side walls, at least one of said walls being constructed of wire formed into a pattern with openings of a sufficiently large size to allow rapid egress and ingress of hot oil and of a sufficiently small size to prevent the food items from passing through the openings;

an insert dimensioned to fit at least partially within said fry basket for being removably disposed therein to maintain food items in said fry basket in a separated condition, said insert comprising:

two longitudinal support members having a length of about the length of said fry basket for being disposed adjacent opposite side walls of said fry basket in a side-by-side parallel relationship with respective side walls;

a plurality of transverse support members extending between and disposed generally perpendicularly to said longitudinal support members, said transverse support members being in a substantially co-planar parallel relationship, one with the others;

a plurality of elongate separator rods mounted on said transverse support members extending perpendicularly from the plane defined by said transverse support members;

at least two separator rods extending from each transverse support member to form a row of separator rods along said support member to define a separator wall of rods that is parallel to the end walls of said fry basket, perpendicular to said side walls of said fry basket, and parallel to the other separator walls; and said insert being disposed to position said separator rods in a center region of said fry basket, whereby said separator rods are disposed between food items placed in said fry basket to prevent the food from sticking together.

7. The system of claim 6 wherein said two longitudinal support members having a length of less than the length of said fry basket and are disposed adjacent to said bottom wall of said fry basket with said separator rods extending upwardly therefrom into a center region of said fry basket so that said insert and food items may be removed from said basket by rotating it to face said open top downwardly.

8. The system of claim 6 wherein said insert is dimensioned to rest on a top edge of at least two walls with said separator rods extending downwardly into a center region of the fry basket.

9. The system of claim 6 wherein said two longitudinal support members have a length of less than the length of said fry basket and said plurality of elongate transverse support members have a length of less than the width of said fry basket, said support members being disposed adjacent to the bottom of said fry basket with the separator rods extending upwardly therefrom into a center region of said fry basket, and further comprising at least one clip engaging at least one support member and said fry basket to secure said insert within said fry basket.

10. The system of claim 6 wherein said support members are disposed adjacent to the open top of said fry basket and further comprising at least one clip engaging at least one support member and said fry basket for removably and securing said insert to said fry basket.

* * * * *